No. 886,643. PATENTED MAY 5, 1908.
H. SANS.
SHOCK WEAKENING DEVICE FOR VEHICLES.
APPLICATION FILED JUNE 23, 1906.

2 SHEETS—SHEET 1.

Witnesses:

Inventor:
Hippolyte Sans
By Knight Bros.
Attys.

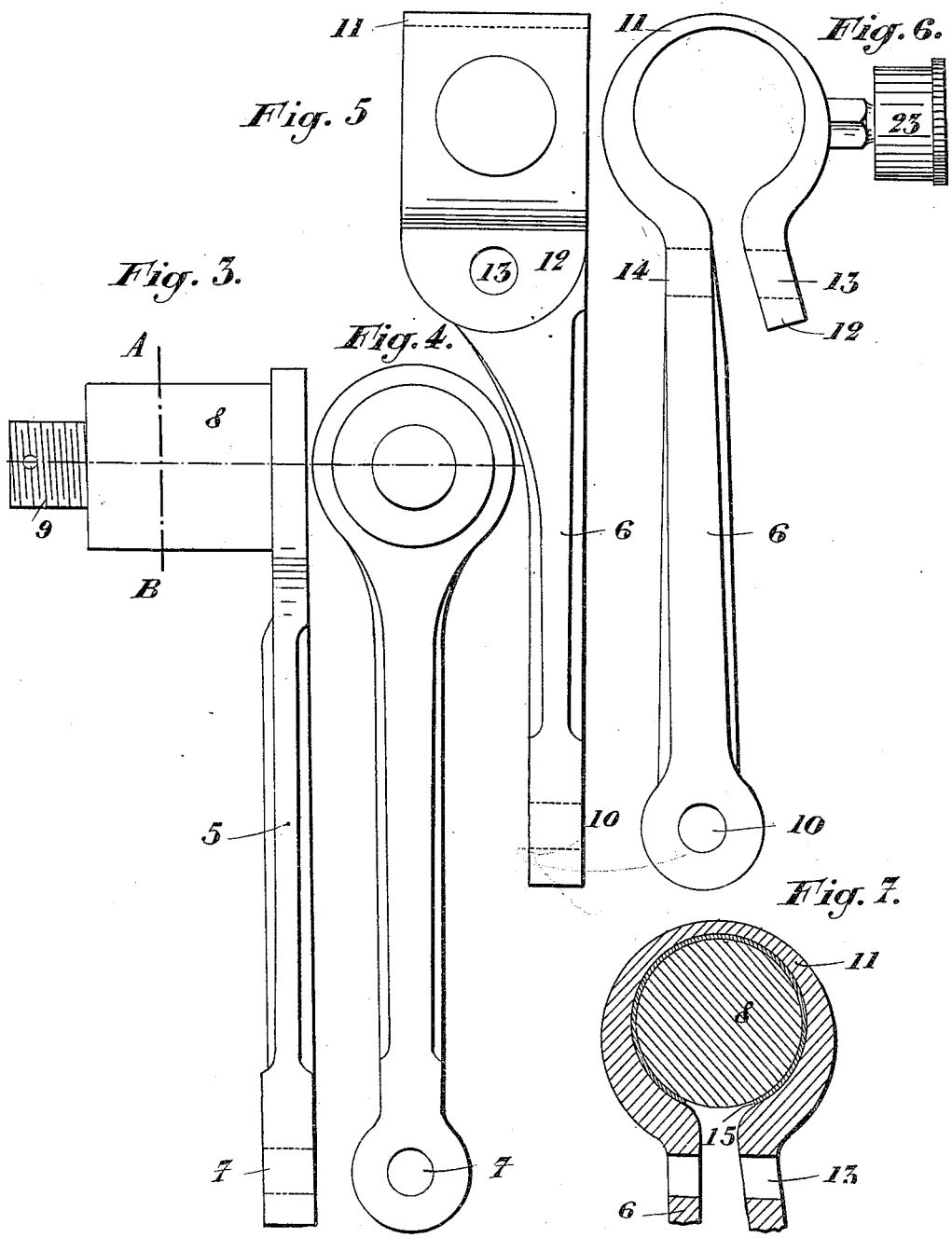

UNITED STATES PATENT OFFICE.

HIPPOLYTE SANS, OF MOLENBEEK, NEAR BRUSSELS, BELGIUM.

SHOCK-WEAKENING DEVICE FOR VEHICLES.

No. 886,643.　　　　Specification of Letters Patent.　　　　Patented May 5, 1908.

Application filed June 23, 1906. Serial No. 323,105.

*To all whom it may concern:*

Be it known that I, HIPPOLYTE SANS, engineer, a citizen of the French Republic, and a resident of Rue Van der Kinderen, 15 Molenbeek, near Brussels, in the Kingdom of Belgium, have invented certain new and useful Improvements in Shock-Weakening Devices for Vehicles, of which the following is a specification.

The present invention relates to a shock weakening device for vehicles.

The invention has for its object to strengthen the spring and to weaken the downward movement of the body of the vehicle when a shock is imparted to the wheels, and more especially to prevent the body from being suddenly thrown back into its normal position when the cause of the shock has been overcome.

The device is applicable to vehicles of all kinds, railway vehicles, tramway vehicles, motor cars, and so on.

Figure 1:
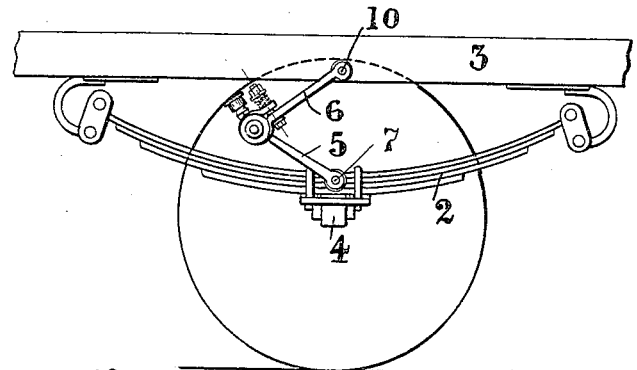
Figure 2:
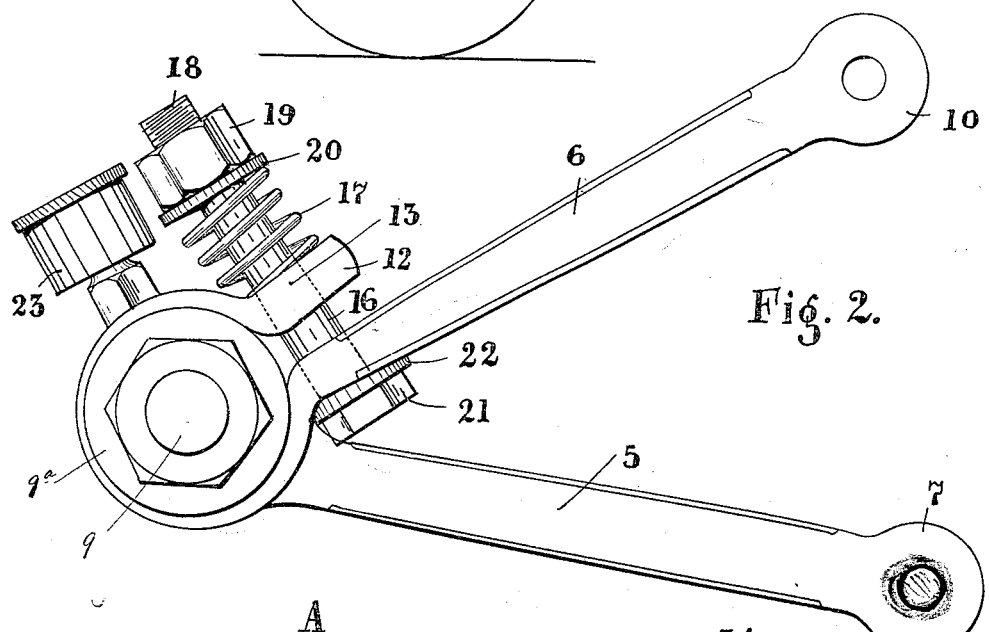
Figures 8, 9:
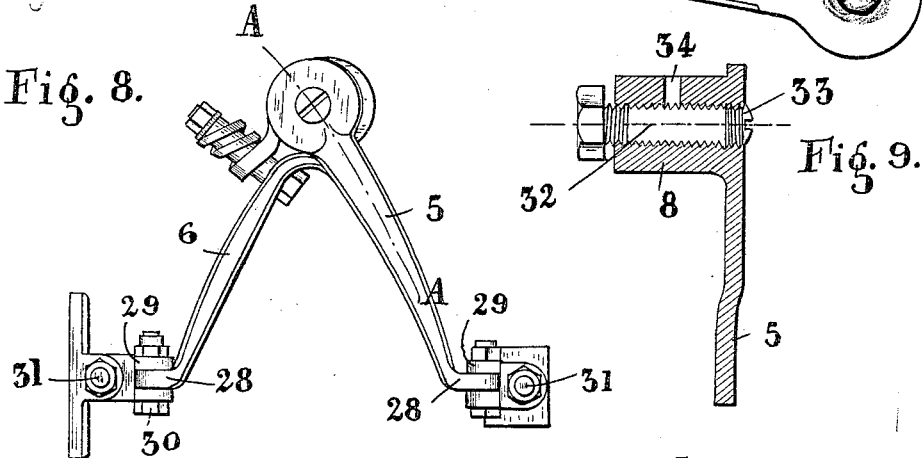

In the annexed drawings, Figure 1 shows diagrammatically the application of the device to a vehicle; Fig. 2 is a side view of the device; Figs. 3 and 4 are respectively a front view and a side view of a detail; Figs. 5 and 6 are respectively a front view and a side view of another detail; Fig. 7 is a section through the assembled parts shown in Figs. 3–6, on the line A B, Fig. 3; Fig. 8 is a side view of another embodiment of the invention, in which the arms are provided with hinges allowing the vehicle body to swing on the shock weakening device; Fig. 9 is a section on the line A A, Fig. 8, and showing a lubricating device for the drum of the shock weakening device.

In Figs. 1 to 7, the shock weakening device, which connects the body of the vehicle 3 with the axle 4, is formed by arms 5 and 6, the former being fixed at 7 to the axle of the vehicle. The arm 5 is provided at its other end with a pivot or drum 8 (Fig. 3) which is surrounded by the yielding annular end or split ring 11 of the other arm 6. The ring 11 is held on the pivot or drum 8, by means of a nut 9ᵃ, which is screwed on the threaded projection 9 of the pivot or drum 8. The arm 6 is fixed at 10 to the body of the car. The ring 11 is provided with a projection 12 which is provided with a hole 13. The arm 6 is also provided with a hole 14 (Fig. 6) and a bolt 16 is introduced in the two holes. A spring 17, which abuts against the projection 12 and against a washer 20 on the bolt 16, tends to force the projection 12 against the arm 6. A washer 22 is inserted between the head 21 of the bolt and the arm 6. The washer 20 is held in position by means of a nut 19 screwed on the threaded end 18 of the bolt. Between the pivot or drum 8 and the inner face of the ring 11 of the arm 6 is placed a suitable lining 15 of leather, vulcanized fiber or any other suitable material, which has for its object to increase the friction between the parts 8 and 11. The lubrication can be obtained by a lubricator such as 23.

When the nut 19 is tightened the bolt 16 is moved and the spring 17 is compressed and the friction between the ring 11 and drum 8 is consequently increased. When the arms 5 and 6 are moved towards or from each other, the friction produced by the ring on the drum must be overcome, and according to the present invention this resistance is less when the arms are moved towards each other, than when they are moved from each other. The following is the reason: When, owing to the action of the body of the vehicle on the end 10 of the arm 6 this arm is pressed down, the other end of the arm, which acts on the spring 17 is moved away from the projection 12 and the ring 11 is somewhat opened so that the friction on the drum 8 is reduced. If, however, the end 10 of the arm 6 is moved upwardly the other end of the arm 6 approaches the projection 12 and tends to close the ring 11, thus increasing the friction between the ring and the drum 8.

The resistance which opposes the relative movement of the arms 5 and 6 and which is due to the friction between the parts 8 and 11 is consequently less when the two arms are moved towards each other, than when they are moved away from each other. It will therefore be easily understood, that when a shock is imparted to a vehicle, the quickness of its downward motion is reduced and its return movement is made slower.

In the embodiment shown in Figs. 8 and 9, the ends 28 of the arms 5 and 6 are perforated in order to receive bolts 30 which connect the parts 28 with the brackets 29, which are fixed by means of nuts 31 respectively to the axle of the vehicle and to the vehicle body. This arrangement enables the apparatus to swing on the bolts 30. The pivot or drum 8 in this case has a bore 32 which contains the lubricant and which is closed by a threaded cap 33. Through an opening 34, the lubricant passes to the surface of the pivot or drum and reaches the places to be lubricated.

It will be seen, that in the described embodiments the oscillations of the vehicle springs 2 cannot act directly on the vehicle body 3, and that the friction of the ring 11 on the pivot or drum 8 must first be overcome. The return movement of the spring is thus made slower, and the subsequent oscillations of the springs are suppressed, as soon as they have returned to their normal position. The shocks which are produced by the unevenness of the road are thus imparted in a considerably less degree to the car body. The operation of the apparatus is at the same time automatically regulated according to the direction of the shocks, so that, as the arm 5, which is connected with the spring 2, approaches the arm 6, which is connected with the body of the vehicle, the resistance produced by friction, is less than when the body of the car moves away from the axle.

What I claim as my invention, and desire to secure by Letters Patent is:

1. The combination with a vehicle spring, of means for retarding the compression and expansion of the spring; said means comprising a pair of arms swingingly connected to each other at one end; one of said arms being provided with a drum and the other arm terminating in a split ring surrounding said drum, and yielding means tending to force the ends of the ring together and holding the ring in frictional engagement with the drum.

2. The combination with the vehicle body, the vehicle spring and the support for the spring, of means for retarding the compression and expansion of the spring; said means comprising a pair of arms swingingly connected to each other at one end and yielding means holding the arms in frictional engagement with each other; said arms having their other ends connected respectively to the spring support and vehicle body to permit oscillation of the arms in a plane transverse to their swinging plane.

In witness whereof I have hereunto set my hand in presence of the witnesses.

HIPPOLYTE SANS.

Witnesses:
   E. LEY,
   GREGORY PHELAN.